United States Patent [19]
McMillan et al.

[11] Patent Number: 5,171,041
[45] Date of Patent: Dec. 15, 1992

[54] REINFORCED FLANGES ON PLASTIC PIPE

[75] Inventors: James S. McMillan, Everman; Sama'an Tarsha, Edgecliff, both of Tex.

[73] Assignee: Dowell Schlumberger Incorporated, Tulsa, Okla.

[21] Appl. No.: 848,174

[22] Filed: Mar. 10, 1992

Related U.S. Application Data

[62] Division of Ser. No. 513,904, Apr. 24, 1990, Pat. No. 5,094,795.

[30] Foreign Application Priority Data

Apr. 24, 1991 [WO] PCT Int'l Appl. .....PCT/US91/02720

[51] Int. Cl.$^5$ .............................................. F16L 47/02
[52] U.S. Cl. ...................................... 285/21; 285/55; 285/363; 285/423; 138/109
[58] Field of Search ............... 285/55, 49, 149, 423, 285/200, 363, 21; 138/109; 264/248, 249, 269, 322; 156/304.2

[56] References Cited

U.S. PATENT DOCUMENTS

| | | |
|---|---|---|
| 830,392 | 9/1906 | Wielemon .......................... 285/423 X |
| 1,948,211 | 2/1934 | Fritz .................................. 285/49 X |
| 2,907,103 | 10/1959 | Lewis . |
| 3,142,868 | 8/1964 | Blount . |
| 3,298,716 | 1/1967 | Taylor . |
| 3,435,853 | 4/1969 | Weeden . |
| 3,650,550 | 3/1972 | West . |
| 3,899,006 | 8/1975 | Chompleboux et al. ....... 285/149 X |
| 4,281,859 | 8/1981 | Davies ................................. 285/55 |
| 4,523,738 | 6/1985 | Raftis .............................. 138/109 X |
| 4,537,425 | 8/1985 | Press et al. ........................... 285/55 |
| 4,961,796 | 10/1990 | Perrin et al. ..................... 264/248 X |

FOREIGN PATENT DOCUMENTS 2240616 2/1974 Fed. Rep. of Germany .
1998828 4/1989 Japan .

*Primary Examiner*—Dave W. Arola
*Attorney, Agent, or Firm*—Stephen A. Littlefield

[57] ABSTRACT

A method an apparatus are shown for forming a flange on an end of a plastic pipe liner of the type used to line a tubular member. A reinforced disc having a rigid portion and an elastomeric portion is placed about the liner exterior and moved into position flush with the flanged end of the tubular member. A retaining ring is placed about the reinforced disc and the disc and liner exposed end are heated to render the materials malleable. A forming unit is then used to apply force to the liner to flow the liner into a reformed shape having a greater external diameter than the remainder of the liner. The forming operation also bonds the reinforced disc to the reformed liner end to further resist any tendency of the liner end to be retracted into the interior of the tubular member.

5 Claims, 5 Drawing Sheets

REINFORCED FLANGES ON PLASTIC PIPE

This is a division of application Ser. No. 07/513,904 filed Apr. 24th, 1990 now Pat. No. 5,094,795 issued Mar. 10, 1992.

BACKGROUND OF THE INVENTION

1. Field of the Invention

This invention relates to a method and device for reforming the end of a plastic pipe to form a flange thereon and to an improved tubular member lined with a plastic pipe liner having such a flanged end.

2. Description of the Prior Art

The installation of plastic pipe liners within tubular members achieves several desirable results. For instance, such liners are used to repair pipelines which have developed cracks or leak points through which conveyed fluid is lost. Such liners are also used to protect metal pipelines from internal corrosion resulting from the corrosive nature of the conveyed fluid. In the case of oil field pipe, many of the fluids transported for completion, stimulation or production have a detrimental effect on the metal from which the pipe is constructed.

The plastic pipe liners which are installed within metal tubular members are usually thermoplastic materials. These materials can be heated to a temperature and for a time sufficient to render the material to a malleable state so that the material can then be formed to the desired shape. The term "plastic" is intended to include, for example polyethylene, polyvinyl chloride, polyvinyl chloride-acetate, polystyrene, and the like.

In the case of flanged metal pipelines, various adapters have been provided in the past for joining sections of the pipeline as well as the associated sections of plastic liners. In one prior art technique, the adapters were fused onto the plastic liner ends which protruded from the section of metallic pipeline. Since the adapters were of a fixed length, it was necessary to accurately calculate the expansion and contraction characteristics of the plastic liner installed within the section of metallic pipeline to prevent the adapter from being pulled out of position upon contraction of the liner.

In other prior art techniques, an exposed portion of the plastic liner was bent backward at an angle or "flared" to form a flange on the plastic liner. U.S. Pat. No. 3,142,868 to Blount, issued Aug. 4, 1964, is typical of this type prior art approach in which a mechanical device is utilized to flare a liner end extending from a tubular member. The process also involved heating, supporting and cooling the flared end.

The prior art techniques all suffer from the shortcoming that the liner flanged end could be drawn longitudinally inward into the interior of the tubular member upon contraction of the liner material. Flaring also created thin wall regions at the flanged end which were subject to shearing and failure.

The present invention has as its object to provide a method and device for forming a flange on an end of a plastic pipe liner which resists the tendency to contract, once installed, and be pulled into the interior of the surrounding tubular member.

Another object of the invention is to provide a simple and economical method for forming such as flange on the plastic pipe liner used to line a tubular member.

Another object of the invention is to provide an improved reinforced disc for reinforcing the plastic pipe liner flange to prevent subsequent movement of the plastic pipe liner flange.

SUMMARY OF THE INVENTION

In the method of the invention, a flange is formed on an end of a plastic pipe liner of the type used to line a tubular member such as a section of a metallic pipeline. The section of metallic pipeline has opposing flanged ends and the plastic pipe liner has opposite ends, at least one of which extends outwardly to be exposed from one of the opposing flanged ends of the tubular member.

A reinforced disc is first installed about the exterior of the exposed end of the plastic pipe liner and moved into position flush with the flanged end of the tubular member. The reinforced disc has a rigid portion and an associated elastomeric portion which is compatible with, or the same as, the material of the plastic liner. Preferably, the rigid portion is a steel plate which is enveloped within an outer elastomeric body having a peripheral edge.

A retaining ring is installed about the peripheral edge of the reinforced disc. The reinforced disc and the exposed end of the plastic pipe liner are then heated with a heating unit for a time and to a temperature sufficient to render the plastic material thereof to a malleable state. The exposed end of the plastic pipe liner is then surrounded with a forming unit having an internal recess. The forming unit also has a drive means for applying force to the exposed liner end to flow the exposed liner end into the internal recess and reform the plastic liner material. As the liner end is being reformed under pressure, it is also bonded to the reinforced disc, whereby the reformed material has a greater outside diameter than the outside diameter of the remainder of the plastic pipe liner and forms a flange for the plastic pipe liner.

Preferably, the forming unit is provided with engagement means for engaging the flanged end of the tubular member and has a circumferential collar which surrounds the exposed end of the plastic pipe liner, the collar having a circumferential recess in the interior thereof. An internal mandrel extends within the collar interior and has an inner extent which is adapted to be received within the interior of the plastic pipe liner for maintaining the liner internal diameter. The drive means is preferably a compression ring which is driven in the direction of the exposed end of the plastic pipe liner to form the liner end downwardly and outwardly into the circumferential recess provided in the collar. The drive means can comprise one or more hydraulic pistons having output shafts which are connected to the compression ring for driving the compression ring.

Additional objects, features and advantages will be apparent in the written description which follows.

BRIEF DESCRIPTION OF THE DRAWINGS

in FIG. 6;

DETAILED DESCRIPTION OF THE INVENTION

Figure 1:
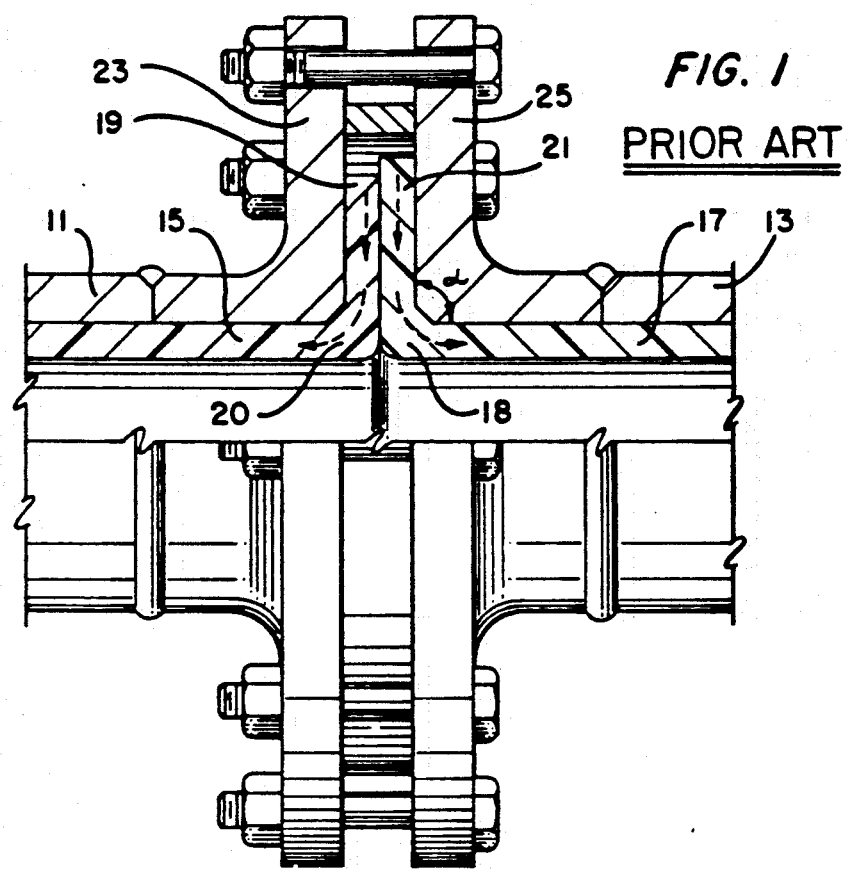
FIG. 1 is a vertical section through a flange joint in a plastic lined metal pipeline in which the flanges formed on the ends of the plastic liner provide a gasket between and coextensive with the raised faces of the conventional flanged ends on the metal pipeline.
Figure 2:
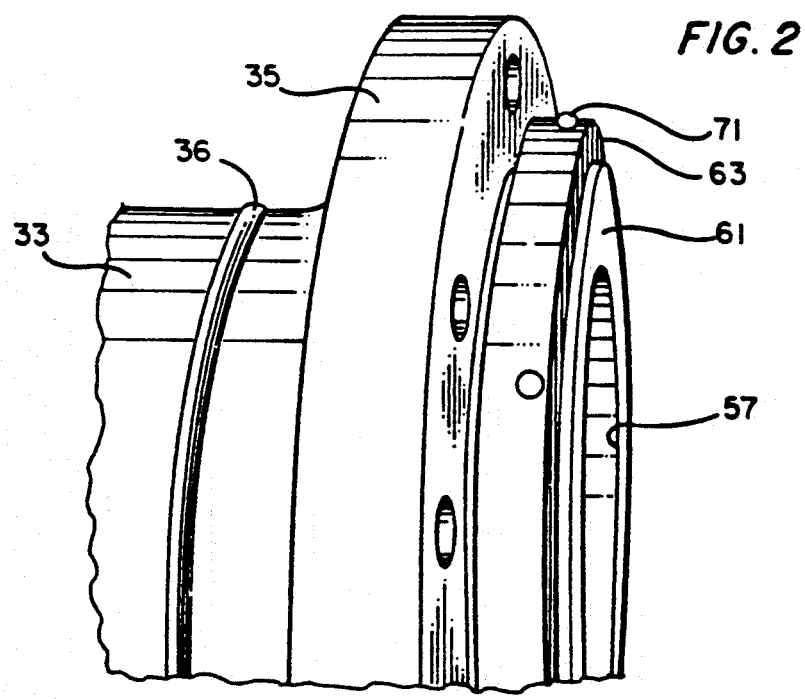
FIG. 2 is a partial, perspective view of the flanged end of a metal pipeline having the flanged plastic pipe liner of the invention installed therein.

FIG. 1 shows a prior art flange joint used to join the adjoining sections 11, 13 of a metal pipeline. Plastic pipe liners 15, 17 are installed within the pipe interiors and include flared ends 19, 21. The two adjacent pipeline sections are joined by bolting the flanged ends 23, 25 together with the flanges 19, 21 on the synthetic liners 15, 17 providing a fluid gasket therebetween. The liner flanges 19, 21 were typically either butt fused onto the liners 15, 17 or were mechanically formed by heating and flaring the liner ends about an angle with respect to the pipe longitudinal axis (α in FIG. 1). As illustrated by the arrows in FIG. 1, the liner flanges 19, 21 tended to contract and "creep" into the pipeline interior. Additionally, the weakened wall sections 18, 20 created by flaring the liner exposed ends created shear regions which were potential failure points for the flange joint.

Figure 8:
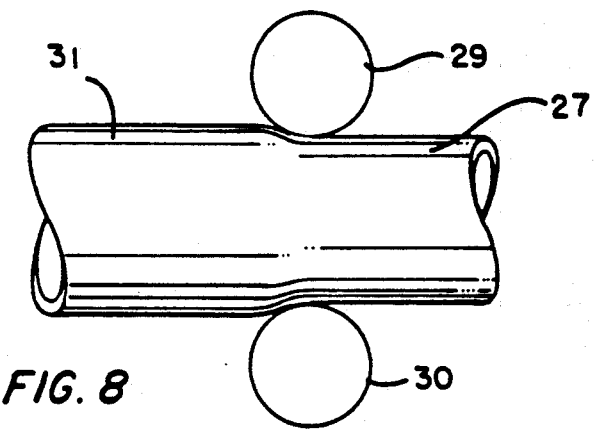
FIGS. 8–10 are simplified, schematic views of the method of the invention showing the sequential steps thereof.

The method of the present invention will now be described with reference to FIGS. 8–10. The plastic pipe liner is first installed within the surrounding metal pipeline. This can be accomplished in a number of ways including stretching and inserting the liner, chemically bonding the liner, etc. FIG. 8 shows a plastic pipe liner 27 which is being downsized by passing through downsizing rollers 29, 31. Prior to recovering its original dimensions, the liner 27 is installed within a section of the metallic pipeline. The material of the liner 27 is preferably one of the conventionally known thermoplastic type materials such as polyethylene.

Another preferred method which can be used to reduce the outside diameter of the liner 31 to a size which is initially smaller than the internal diameter of the tubular member 33 to be lined is described in our co-pending application, entitled "Apparatus And Method For Lining Tubular Members", Ser. No. 258,796, filed Oct. 17, 1988.

Figure 9:
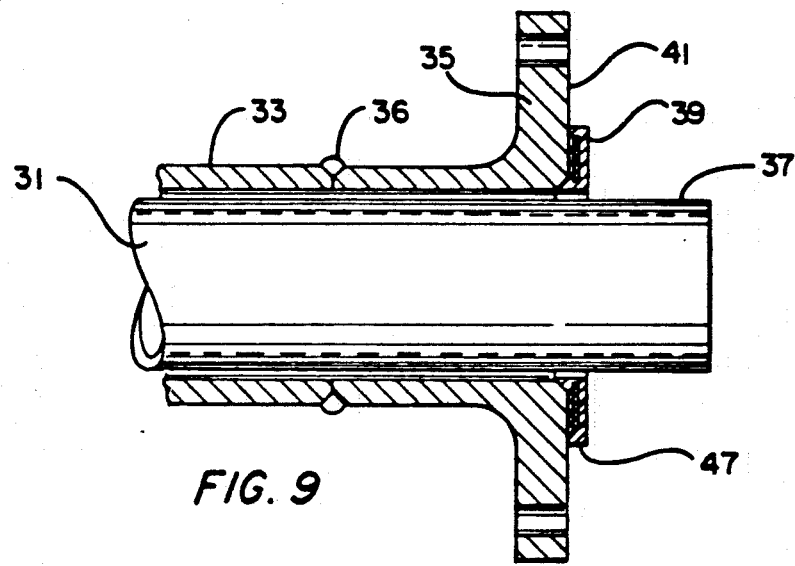
Figure 10:
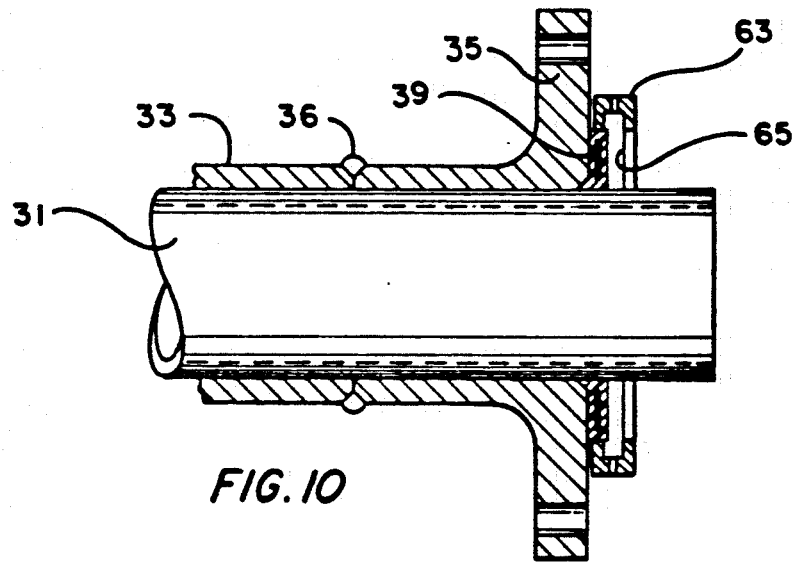

FIG. 9 shows the liner 31 installed within a tubular member such as metallic pipeline section 33 having a flanged end 35 joined at a weld line 36. At least one of the opposite ends 37 of the plastic pipe liner is extending outwardly to be exposed from the flanged end 35. Preferably, both ends are exposed.

Figure 4:
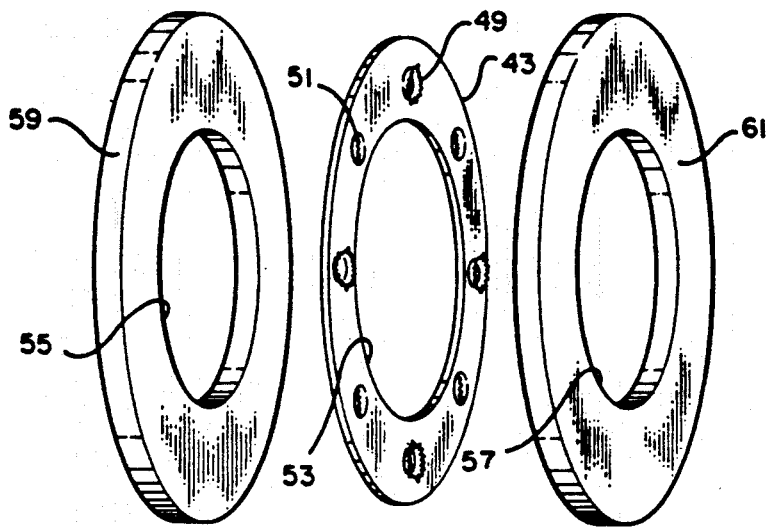
FIG. 4 is an exploded view of the reinforced disc used to form the improved flange joint of the invention.
Figure 5:
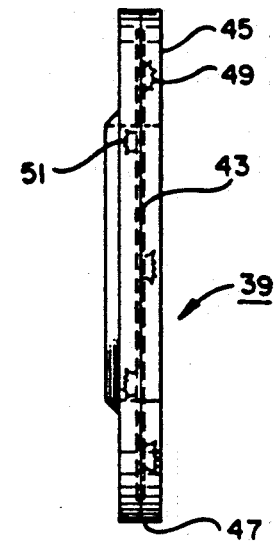
FIG. 5 is a side view of the reinforced disc of FIG. 4 showing the rigid internal member which is enveloped within the outer elastomeric body.

A reinforced disc 39 is then installed about the exterior of the exposed end 37 of the plastic pipe liner 31 and moved into position flush with the outer surface 41 of the flanged end 35. The reinforced disc 39 is shown in greater detail in FIG. 4–6. The disc 39 has a rigid portion 43 and an associated elastomeric portion 45 (FIG. 5). Preferably, the rigid portion 43 is an internal steel plate, such as plate 43 formed of 16 gauge steel, having a plurality of oppositely extending protrusions (e.g., protrusions 49, 51) formed therein. As shown in FIG. 4, the steel plate 43 has a central opening 53 which is coincident with the central openings 55, 57 in the elastomeric body portions 59, 61. The steel plate is also of smaller outside diameter and of greater inside diameter than the body portions 59, 61, whereby the plate 43 is enveloped within the elastomeric body in the preferred embodiment shown in FIG. 5.

Preferably, the reinforced disc 39 is prefabricated by sandwiching the steel plate 43 between upper and lower elastomeric bodies 59, 61 in a mold and encapsulating the steel plate within the elastomeric bodies by application of heat and pressure in the mold. This produces a reinforced disc 39, as shown in FIG. 5 having a rigid internal member 43 enveloped within the elastomeric body with the protrusions 49, 51 being oppositely arranged within the body. The material of the bodies 59, 61 is compatible with the material of the liner 31 for subsequent bonding and can be identical, i.e., polyethylene.

Figure 3:
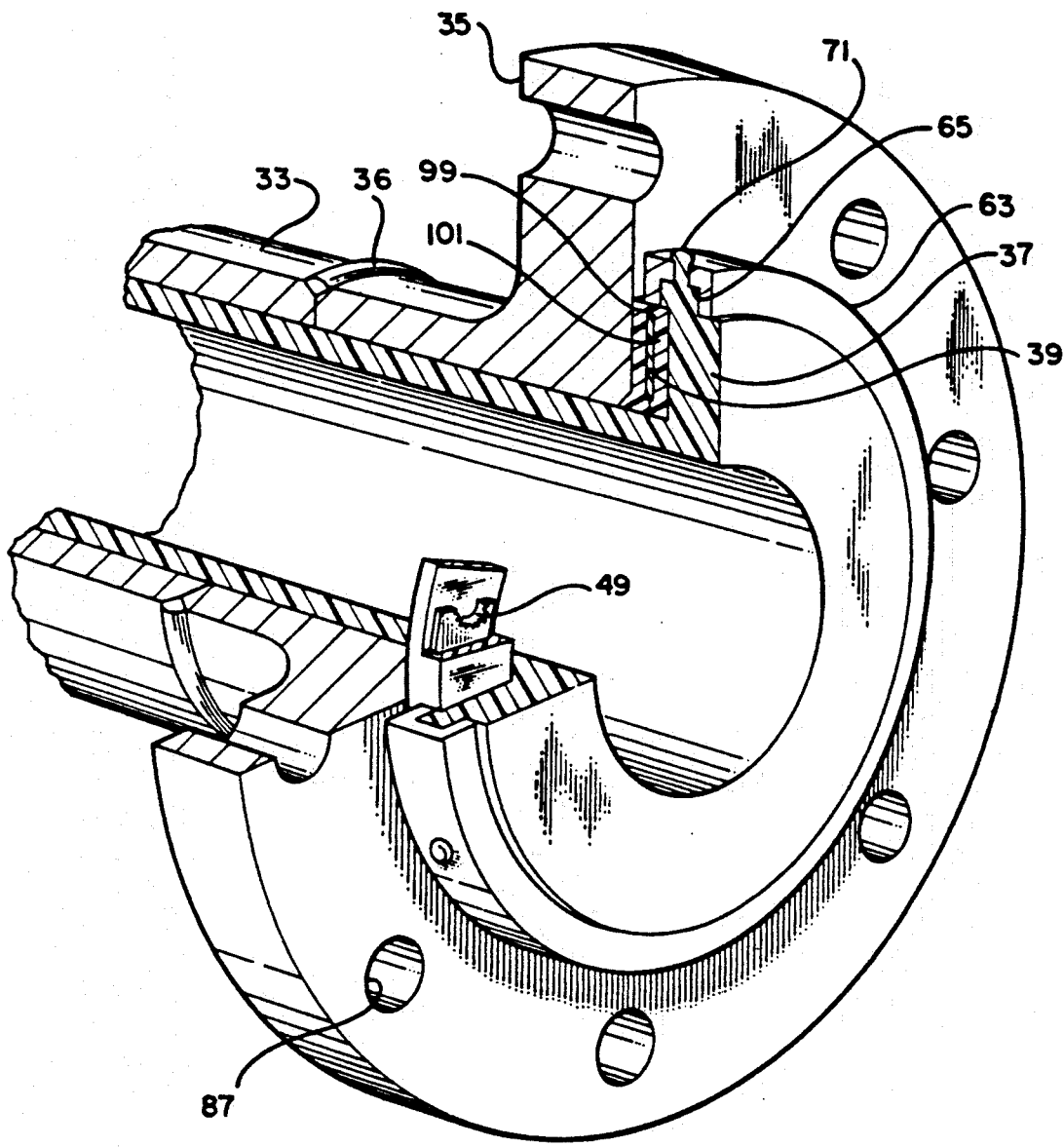
FIG. 3 is a partial, perspective view of the metal pipeline and flanged plastic pipe liner of FIG. 2, partly broken away for ease of illustration.
Figure 6:
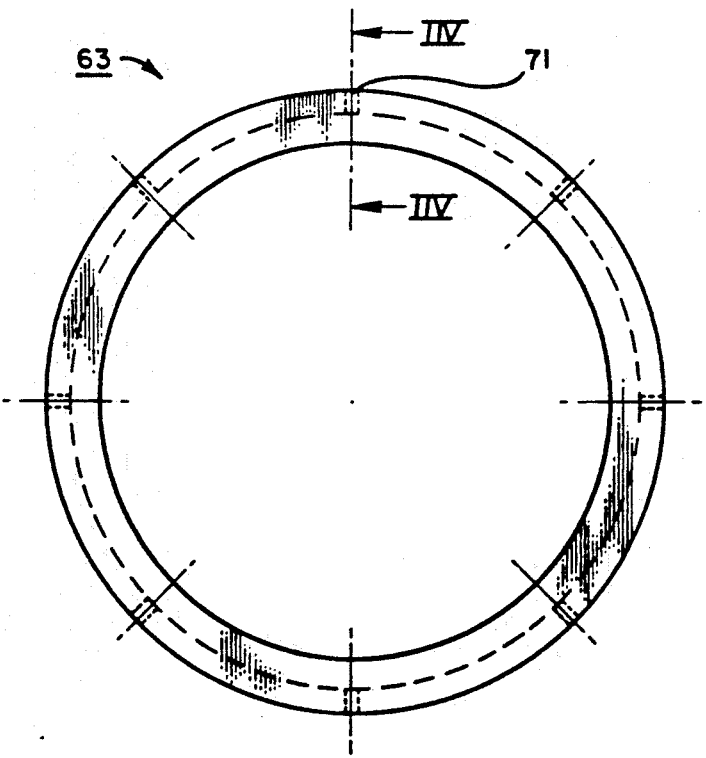
FIG. 6 is a side view of the retaining ring used to form the flange joint of the invention.
Figure 7:
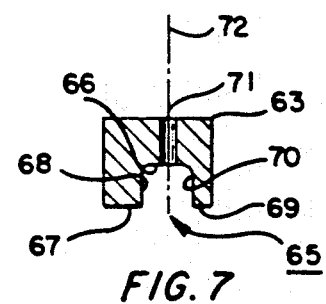
FIG. 7 is a side, cross-sectional view taken along lines VII.—VII.

In the next step of the method, a retaining ring 63 is installed about the peripheral edge 47 of the reinforced disc 39. As shown in FIG. 6, the retaining ring 63 is preferably formed from a suitable metal such as steel and has an internal groove 65 having a bottom wall 66, inner and outer sidewalls 68, 70 and inner and outer lips 67, 69. A plurality of vent holes 71 are provided at spaced intervals about the outer circumference of the ring 63. As shown in FIGS. 3 and 7, the groove 65 is offset slightly from the central axis 72 of the retaining ring 63. As shown in FIG. 10, the retaining ring 63 is initially placed about the outer diameter of the reinforced disc 39 with the inner lip 67 resting on the peripheral edge 47 thereof.

Figure 11:
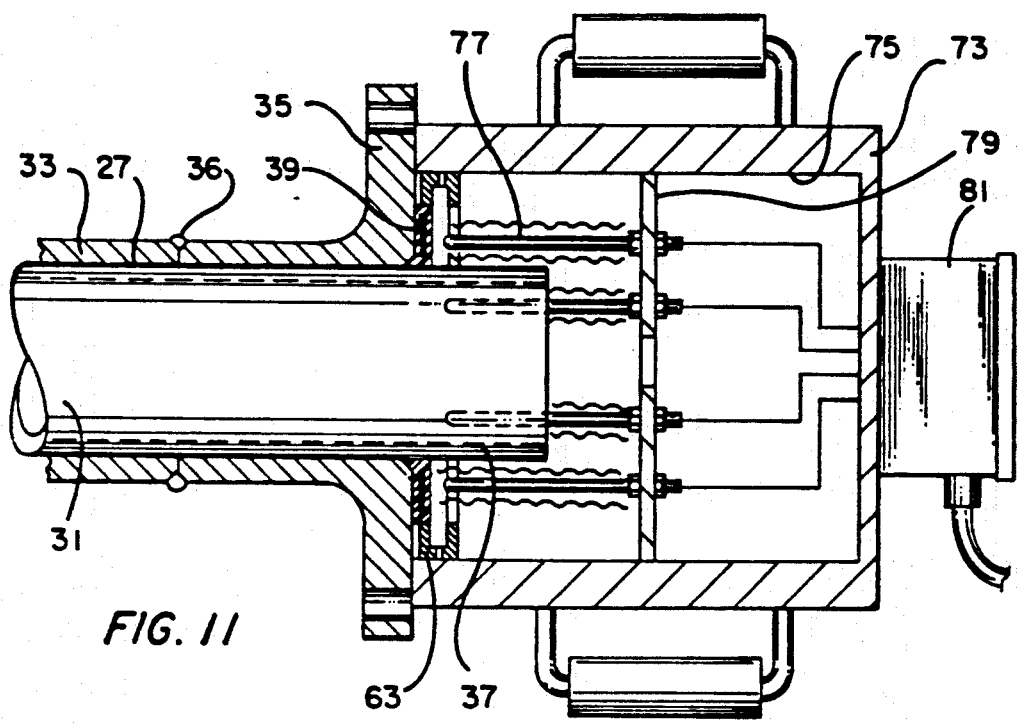
FIG. 11 is a simplified, side view of the heating unit used to heat the exposed liner end in the method of the invention.

As shown in FIG. 11, the reinforced disc 39 and plastic liner end 37 are then heated for a time and to a temperature sufficient to render the elastomeric material thereof to a malleable state. In the case of thermoplastic pipes, such as those made from polyethylene, it is desirable to heat the material above about 300° F. in order to saturate the pipe exposed end 37 above about 257° F. This renders the plastic material "malleable" allowing it not only to bend, but to flow and be reformed into the desired shape.

The heating step can be accomplished in various ways. In the preferred embodiment of FIG. 11, a heating unit 73 having an open interior 75 is slipped about the retaining ring 63 and is provided with a plurality of internal heating elements such as electric, tubular heater elements 77. These heater elements are available from a variety of commercial sources and are formed, e.g., from compressed ceramic in stainless steel jackets. A plurality of heater elements are arranged circumferentially about the liner end 37 within the heating unit to provide approximately 340 watts of heat, thereby allowing the heating unit to saturate the liner material to 257° F. The heating elements 77, in the embodiment shown, are mounted in holes provided in a support plate 79 and are powered by a conventional electric power source 81. Suitable heating elements are commercially available from Watlow Electric Manufacturing Company of St. Louis, Mo.

Figure 12:
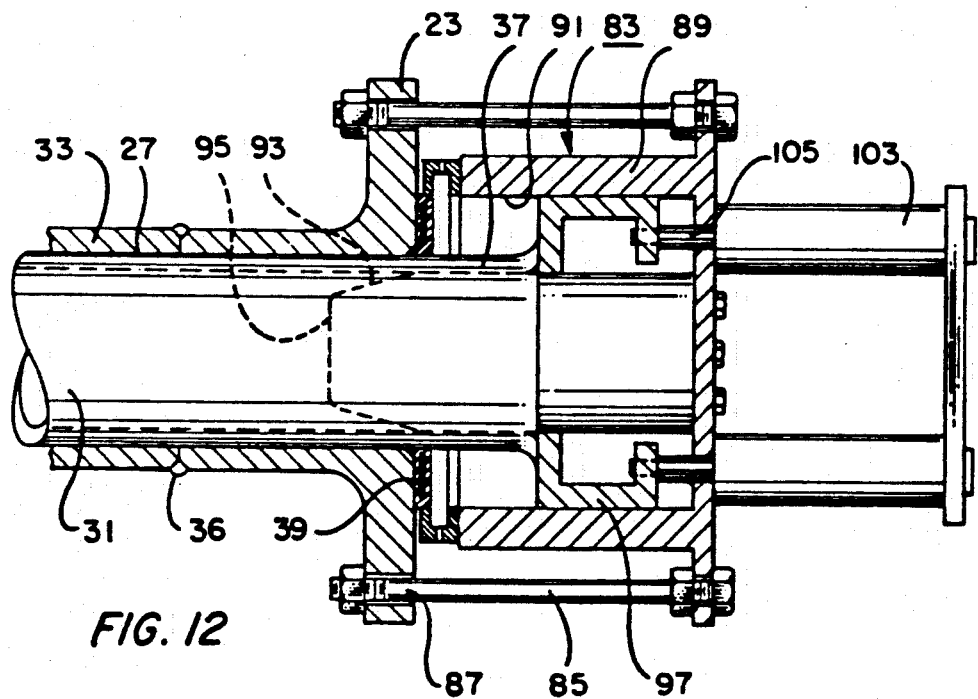
FIG. 12 is a side, simplified view of the forming unit used to form the liner flange of the invention.

As shown in FIG. 12, a forming unit 83 is then placed about the exposed end 37 of the plastic pipe liner 27. The forming unit 83 is provided with suitable engagement means such as the engagement bolts 85 for engaging corresponding bolt openings 87 provided in the flange fitting 23 of the tubular member 33. The forming unit 83 has an internal recess provided by, e.g., the circumferential collar 89 which surrounds the exposed end 37 of the plastic pipe liner. The collar 89 forms a circumferential recess 91 in the interior of the forming unit 83. An internal mandrel 93 extends within the collar recess and has an inner extent 95 which is adapted to be received within the interior of the plastic pipe liner for maintaining the liner internal diameter during the forming operation.

Drive means, such as compression ring 97 are located between the internal mandrel 93 and the collar interior for contacting the plastic pipe liner exposed end 37 to form the liner end outwardly into the circumferential recess 91. The drive means used to drive the compression ring 97 in the direction of the exposed end 37 of the plastic pipe liner can comprise a plurality of hydraulic cylinders 103 mounted on the body of the forming unit 83 and having output shafts 105 which are engaged with the compression ring 97 to move the compression ring longitudinally with respect to the forming unit and form the liner end 37 outwardly into the circumferential recess 91 provided in the collar of the forming unit. Preferably, the hydraulic cylinders 103 are capable of applying about 900-1000 psi pressure on the exposed liner end. Note that the liner exposed end 37 is not being "flared", but rather is being flowed and reformed to the desired shape. Also, because both the liner exposed end 37 and reinforced disc 39 have been heated and they forced together under pressure, a fusion weld is formed between the disc and the reformed liner end.

With reference to FIG. 3, it will be appreciated that the liner exposed end 37 has been flowed or "reformed" to a greater outside diameter. Note that the action of the compression ring 97 on the malleable material is to force down the material into a reformed mass, rather than flaring the exposed end through an angle about the pipe flange. It will be appreciated from FIG. 3 that the liner end 37 has, in fact, extruded into the internal groove 65 of the retaining ring 63 and that the material has flowed out the vent holes 71. Note that the groove 65 is offset slightly from the central axis of the retaining ring 63 so that a shoulder 99 of the reformed liner extends over and captures an upper corner 101 of the reinforced disc 39.

An invention has been provided with several advantages. The flange fitting shown in FIG. 3 differs significantly from the prior art arrangements in which the exposed liner end was either flared back at a angle over the pipe flange or in which the end was elastically stretched outward, clamped and butt fused to a preformed end cap. Applicants reinforced disc has at least one face bonded to the reformed liner end to prevent the liner end from being retracted within the pipe interior. The rigid plate associated with the reinforcement disc reduces the shear force exerted on the reformed liner end due to the tendency of the liner to contract. The reinforced disc also serves the purpose of an insulator during the heating step of the method to prevent the pipe flange from acting as a heat sink, thereby preventing embrittlement or damage to that portion of the liner adjacent the flange opening.

While the invention has been shown in only one of its forms, it is not thus limited but is susceptible to various changes and modifications without departing from the spirit thereof.

We claim:

1. An improved flange fitting for a tubular member having flanged ends and having a plastic pipe liner with opposite ends installed therein, at least one of the ends extending at least partly from the tubular member, the improved flange fitting comprising:
   a reinforced disc located about the exterior of the extending liner end flush with the flanged end of the tubular member, the reinforced disc having a rigid internal member which is encapsulated within an elastomeric body, the reinforced disc also having a peripheral edge;
   a reformed end on the plastic pipe liner of greater external diameter than the external diameter of the remainder of the liner which extends within the tubular member, the reformed end on the plastic pipe liner being fusion welded to the reinforced disc through the use of heat and pressure; and
   a metallic retaining ring located about the peripheral edge of the reinforced disc and about the increased external diameter of the liner end.

2. The improved liner flange of claim 1, wherein the rigid internal member is a steel plate having a plurality of oppositely extending protrusions formed therein.

3. The improved liner flange of claim 2, wherein the reinforced disc is prefabricated by sandwiching the steel plate between upper and lower elastomeric bodies in a mold and encapsulating the steel plate within the elastomeric bodies by the application of heat and pressure.

4. The improved liner flange of claim 3, wherein the retaining ring is provided with an internal groove for receiving a portion of the reformed liner end.

5. A reinforced disc of the type used to form a flange fitting on a tubular member having flanged ends and having a plastic pipe liner with opposite ends installed therein, at least one of the ends extending at least partly from the tubular member, the reinforced disc comprising:
   a rigid plate sandwiched between upper and lower elastomeric body portions, the plate having a central opening located on an axis which is concentric with mating openings provided in the elastomeric body portions, the outside diameter of the rigid plate being smaller than the respective outside diameter of the elastomeric body portions and the inside diameter of the rigid plate being greater than the inside diameter of the elastomeric body portions, whereby the rigid plate is enveloped within the elastomeric bodies; and
   wherein the rigid plate has a plurality of oppositely extending protrusions formed therein.

* * * * *